United States Patent [19]
Lew

[11] Patent Number: 5,231,881
[45] Date of Patent: * Aug. 3, 1993

[54] DIGITAL PRESSURE SENSOR WITH A PRETENSIONED VIBRATING CORD

[76] Inventor: Hyok S. Lew, 7890 Oak St., Arvada, Colo. 80005

[*] Notice: The portion of the term of this patent subsequent to Apr. 2, 2008 has been disclaimed.

[21] Appl. No.: 677,295

[22] Filed: Mar. 29, 1991

Related U.S. Application Data

[63] Continuation-in-part of Ser. No. 39,383, Apr. 17, 1987, Pat. No. 5,003,825.

[51] Int. Cl.$^5$ ............................................. G01L 11/00
[52] U.S. Cl. .................................................... 73/704
[58] Field of Search ................................. 73/702, 704

[56] References Cited

U.S. PATENT DOCUMENTS

| | | | |
|---|---|---|---|
| 3,019,641 | 2/1962 | Shapiro | 73/704 |
| 3,079,800 | 3/1963 | Hoar | 73/704 |
| 3,478,594 | 11/1969 | Love | 73/704 |
| 3,543,585 | 12/1970 | Brown | 73/704 |
| 3,721,127 | 3/1973 | Garcea | 73/715 |
| 4,476,725 | 10/1984 | Chorel et al. | 73/704 |
| 5,003,825 | 4/1991 | Lew | 73/704 |

FOREIGN PATENT DOCUMENTS 2144067  9/1971  Fed. Rep. of Germany ........ 73/704

*Primary Examiner*—Robert Raevis

[57] ABSTRACT

A pressure measuring device comprises a pair of pressure compartments, a deflective structural element subjected to a force resulting from a differential pressure between two pressures respectively introduced into the two pressure compartments, and a pair flexible elongated members respectively anchored to and extending from the two opposite sides of the deflective structural element in two opposite directions, wherein one of the two flexible elongated members is anchored fixedly to a stationary support at its extremity, while the other of the two flexible elongated members is anchored to the stationary support in a spring biased arrangement that keeps the tension on the other of the two flexible elongated members constant; wherein a data processor determines the differential pressure between the two pressure compartments as a function of the natural frequencies of flexural vibrations of the two flexible elongated members.

12 Claims, 3 Drawing Sheets

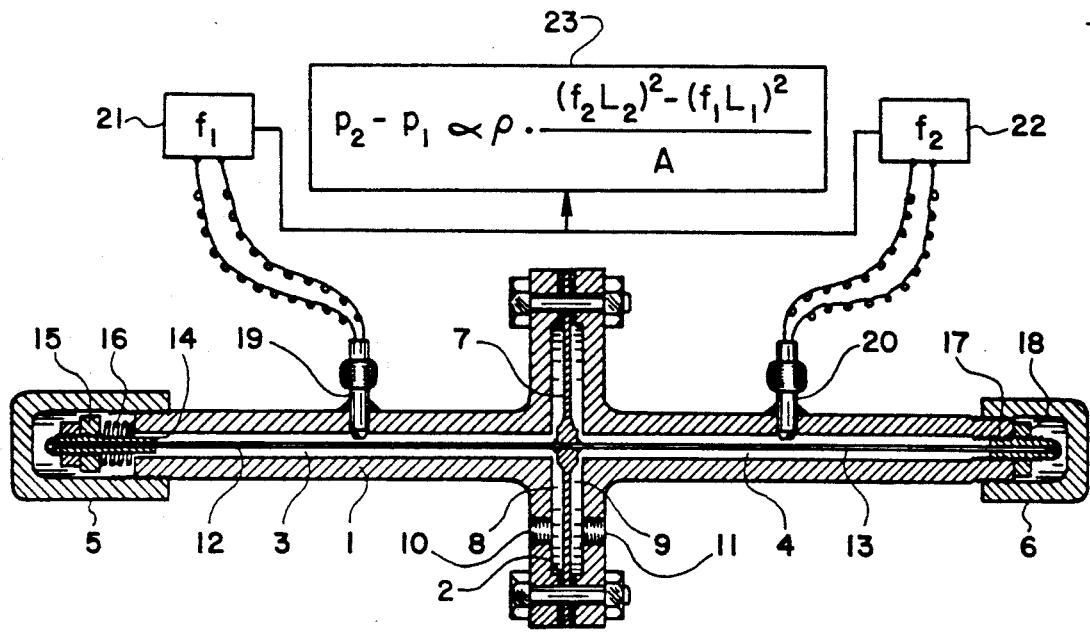
Fig. 1
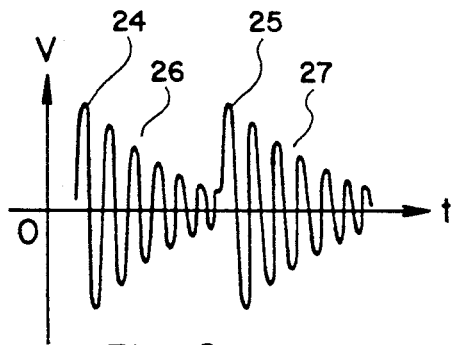
Fig. 2
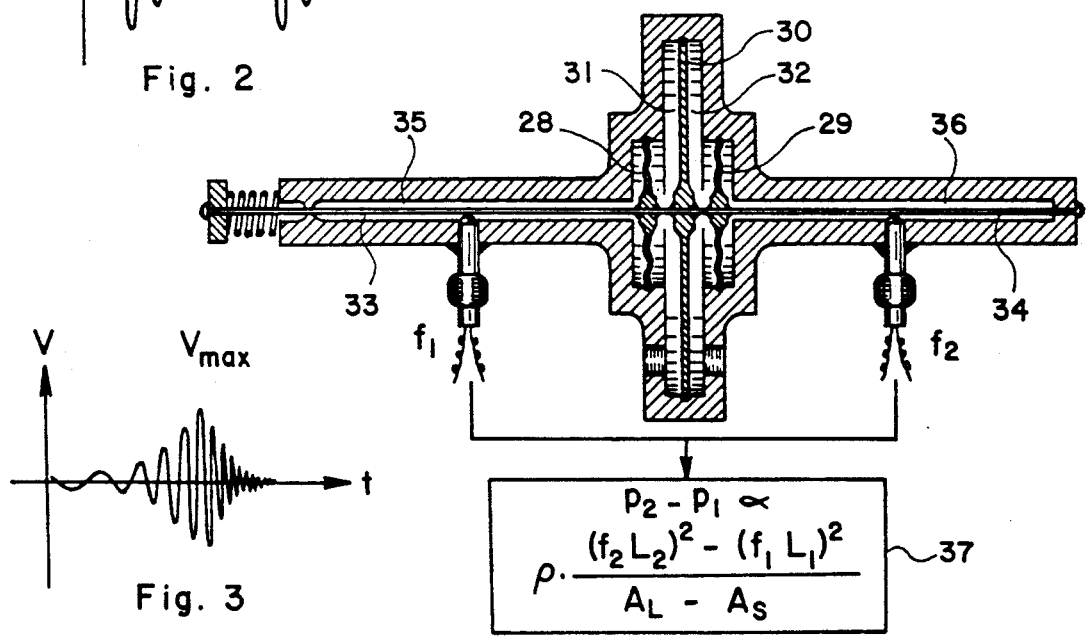
Fig. 3
Fig. 4

1

DIGITAL PRESSURE SENSOR WITH A PRETENSIONED VIBRATING CORD

This patent application is a continuation-in-part to a patent application Ser. No. 07/039,383 entitled "Digital Pressure Sensor" filed on Apr. 17, 1987, that is now U.S. Pat. No. 5,003,825, and consequently, the priority on the invention described and claimed in the present application is based on the aforementioned parent application.

BACKGROUND OF THE INVENTION

There are many different versions of pressure sensors available for industrial plants and scientific laboratories at the present time. With few exceptions, these pressure sensors require one or other forms of corrective measures in order to compensate errors originating from the changing ambient conditions such as change of temperature or change of the electromagnetic properties of the ambient medium. As a matter of fact, all instruments relying on analog signals in executing the function of measurement suffer from drift of the signal resulting in error in the outcome of the measurement unless these instruments include a device that compensates for the effect of drift of the signal. An instrument operating on a digital signal generated by a physical phenomenon directly associated with the physical viriable under measurement is much preferred over the instruments operating on analog signals, because such a digitally operating instrument leaves no room for doubt as the digital instrument works accurately if it functions or it does not function at all. The present invention teaches a pressure sensor operating on a digital signal, of which frequency varies as a function of the magnitude of the pressure under measurement.

BRIEF SUMMARY OF THE INVENTION

The primary object of the present invention is to provide a digital pressure sensor comprising a pair of cords extending from a deflective partitioning member respectively in two opposite directions and anchored to a support at the extremities thereof, wherein the two opposite faces of the deflective partioning member are respectively exposed to two different pressures, and one of the two cords is anchored in a fixed arrangement at the extremity thereof, while the other of the two cords is anchored in an extendable manner by means of a bias spring at the extremity thereof. The value of differential pressure across the deflective partitioning member is determined as a function of resonance frequencies of the two cords.

Another object is to provide the digital pressure sensor described in the primary object of the present invention that includes pressure barriers isolating regions accommodating the vibrating portions of the two cords from the fluid exerting pressure on at least one face of the deflective partitioning member.

These and other objects of the present invention will become clear as the description of the present invention progresses.

BRIEF DESCRIPTION OF THE FIGURES

The present invention can be described with a greater clarity and specificity by referring to the following figures:

FIG. 1 illustrates a cross section of an embodiment of the digital pressure sensor of the present invention and the operating principles thereof.

FIG. 2 illustrates a mode of flexural vibration imposed on at least one of the two flexible elongated members included in the digital pressure sensor shown in FIG. 1.

FIG. 3 illustrates another mode of flexural vibration imposed on at least one of the two flexible elongated members included in the digital pressure sensor.

FIG. 4 illustrates a cross section of another embodiment of the digital pressure sensor.

DESCRIPTION OF THE ILLUSTRATED EMBODIMENTS

Figure 5:
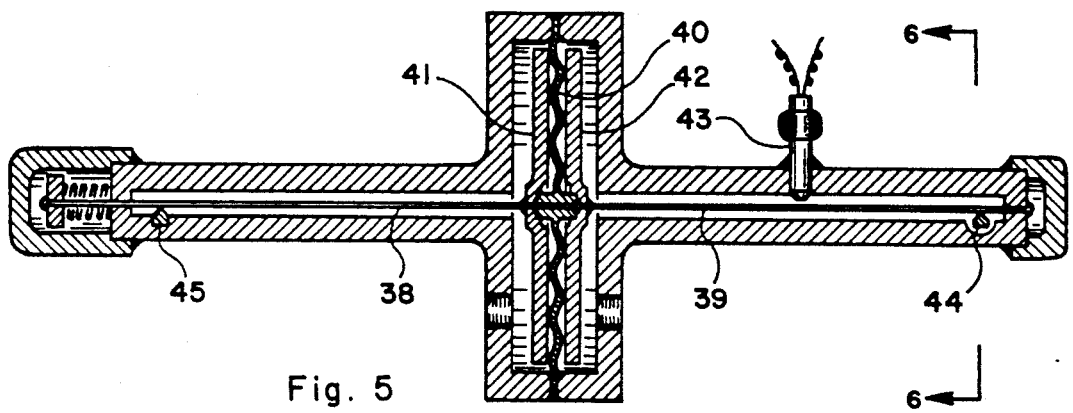
FIG. 5 illustrates a cross section of a further embodiment of the digital pressure sensor.

In FIG. 1 there is illustrated a cross section of an embodiment of the digital pressure sensor constructed in accordance with the principles of the present invention. The body 1 of the pressure sensor comprises a differential pressure chamber 2 and a pair of elongated cavities 3 and 4 extending from the differential pressure chamber 2 respectively in two opposite directions in a coaxial arrangement. The extremities of the two elongated cavities 3 and 4 are respectively sealed by a pair of caps 5 and 6. A deflective structural element such as the deflective disc or diaphragm 7 divides the differential pressure chamber 2 into two compartments 8 and 9 respectively including the pressure ports 10 and 11. A pair of flexible elongated members 12 and 13 with first extremities anchored to the central portion of the deflective structural element such as the disc 7 extend therefrom in two opposite directions respectively through the two elongated cavities 3 and 4, wherein the second extremity of the elongated member 12 is secured to an anchoring member 14 threadedly engaging a combination 15 of a nut and a lock nut supported by a coil spring 16 seating on the structural extremity of the elongated cavity 3, while the second extremity of the elongated member 13 is secured to an anchoring member 17 threadedly engaging a nut 18 supported directly by the structural extremity of the elongated cavity 4. It is readily recognized that the initial tensions on the two elongated members 12 and 13 can be adjusted and equalized by adjusting the nuts 15 and 18. A pair of electromagnetic vibrator-sensors 19 and 20 respectively induce the natural flexural vibrations of the two elongated members 12 and 13 and detect the flexural vibratory motions thereof. A pair of frequency detectors 21 and 22 determine the natural frequencies of the flexural vibrations of the two elongated members 12 and 13 from the electrical signals supplied by the two electromagnetic vibrator-sensors 19 and 20. The data processor 23 determines the value of the differential pressure across the disc or diaphragm 7 as a function of the natural frequencies of the two elongated members 12 and 13 by carrying out necessary mathematical operations.

It is a well known fact that the natural frequency f of the flexural vibration of a flexible elongated member under a tension is related to the value of the tension T, linear density $\rho$ of the flexible elongated member and length L thereof by the equation $$f \propto \frac{1}{L} \sqrt{\frac{T}{\rho}} . \tag{1}$$

The tension $T_1$ and $T_2$ on the two flexible elongated members 12 and 13 are respectively given by equations $$T_1 = T_0 - \alpha(P_2 - P_1)A \tag{2}$$

and $$T_2 = T_0 + \alpha(P_2 - P_1)A \tag{3}$$

where $P_1$ and $P_2$ are pressures respectively introduced through the two pressure ports 10 and 11, A is the area of the disc or diaphragm 7, and $\alpha$ is a parameter of very small magnitude. When the tension $T_1$ and $T_2$ appearing in equations (2) and (3) are eliminated by using equation (1), and equations (2) and (3) are combined to cancel out the initial tension $T_0$, the following equation results in:

$$p_2 - p_1 \propto \frac{1}{A} [\rho_2(f_2 L_2)^2 - \rho_1(f_1 L_1)^2]. \tag{4}$$

where the subscripts 1 and 2 respectively stand for the two flexible elongated members 12 and 13. If the two flexible elongated members 12 and 13 are made of the same string, wire or cord, the equation (4) reduces to $$p_2 - p_1 \propto \frac{\rho}{A} [(f_2 L_2)^2 - (f_1 L_1)^2]. \tag{5}$$

According to equation (4) or (5), the differential value of the pressure across the deflective structural element such as the disc or diaphragm 7 can be determined from the measured values of the natural or resonance frequencies $f_1$ and $f_2$ of the flexural vibrations of the two flexible elongated members 12 and 13 by using an empirically determined equation equivalent to equation (4) or (5). The patentable feature of the present invention includes the single coil spring 16 employed in anchoring only one of the two flexible elongated members 12 and 13 in an axially displaceable arrangement. The higher of the two pressures $P_1$ and $P_2$ is introduced into the pressure compartment 9 wherein the flexible elongated member 13 is fixedly anchored at its extremity, while the lower of the two pressures $P_1$ and $P_2$ is introduced into the pressure compartment 8 wherein the flexible elongated member 12 is anchored in a spring biased arrangement. Although the initial tension $T_0$ appearing in equations (2) and (3) plays no role in determining the value of the differential pressure, it is imperatively required for the following reasons: Firstly, it is evident from equation (1) that the tension on either of the two flexible elongated members 12 and 13 can not be less than zero. The coil spring 16 guarantees the positively finite value of the tension for both flexible elongated members 12 and 13. Secondly, there are all different kinds of structural vibrations of very low frequencies transmitted from the source of the pressures such as pipe lines, reservoir tanks, etc. to the digital pressure sensor. The coil spring 16 can be adjusted to provide a high enough initial tension whereby the flexural vibrations of both flexible elongated members 12 and 13 occur at natural frequencies significantly higher than the frequencies of the vibration noise, which combination facilitates the accurate measurement of the natural frequencies of the flexural vibrations and thus ensures a greater accuracy in measuring the value of differential pressure. It must be understood that only one of the two flexible elongated members 12 and 13 disposed in the pressure compartment receiving the lower of the two pressures has to be anchored in a spring biased arrangement including the coil spring 16. If both flexible elongated members 12 and 13 are anchored in a spring biased arrangement at their extremities, the differential pressure force across the disc or diaphragm 7 stretches the coil spring anchoring the flexible elongated member disposed on the high pressure side, which stretching in turn bends the disc or diaphragm 7 and introduces the bending stress of the disc or diaphragm 7 into the equilibrium of force invalidating the simple and clean mathematical relationship defined by equations (2) and (3). As a consequence, a digital pressure sensor of construction similar to the embodiment shown in FIG. 1, that employs a pair of coil springs respectively anchoring the extremities of both flexible elongated members 12 and 13 does not work in reality due to the complexity and unpredictability of the mathematical relationship between the differential pressure and the tensions on the two flexible elongated members.

The elongated member 13 extending from the diaphragm 7 and anchored fixedly to the body 1 at the extremity thereof in an arrangement free of a tension spring prevents the diaphragm 7 from experiencing a bending deflection, that introduces a bending stress into the picture of equilibrium between the differential pressure across the diaphragm 7 and the difference in the tension between the two elongated members 12 and 13.

In FIG. 2 there is illustrated an example of inducing and detecting the flexural vibration of a flexible elongated member such as the element 12 or 13 included in the digital pressure sensor shown in FIG. 1. The electromagnetic vibrator-sensor 19 or 20 included in the embodiment shown in FIG. 1 intermittently applies a series of mechanical impulses, which generates a series of flexural vibration of the flexible elongated member 24 and 25 respectively including the vibrations 26 and 27 occurring at the natural or resonance frequency, which flexural vibration is detected by the same electromagnetic vibrator-sensor between the application of adjacent mechanical impulses. Of course, the flexible elongated members must be made of a ferromagnetic material in the particular illustrative embodiment shown in FIG. 1.

In FIG. 3 there is illustrated another embodiment of inducing and measuring the flexural vibration of the flexible elongated member. An electromagnetic vibrator applies a series of packets of electromagnetic vibratory force to the flexible elongated member in a frequency sweep mode. The natural or resonance frequency is the frequency corresponding to the maximum amplitude of the flexural vibration. There must be a separate electromagnetic vibrator and sensor for each flexible elongated member in order to practice this method of determining the natural or resonance frequency of the flexural vibration.

In FIG. 4 there is illustrated a cross section of another embodiment of the digital pressure sensor of the present invention having a construction similar to the embodiment shown in FIG. 1. The differential pressure chamber comprises a deflective structural element including two discs or diaphragms 28 and 29 of small area and a disc or diaphragm 30 of large area disposed across an enlarged section of the pressure chamber intermediate the two discs or diaphragms 28 and 29, which combination provides pressure compartments 31 and 32 including two pressure ports, respectively. The three discs or diaphragms 28, 29 and 30 are tied together by a midsection of the elongated member providing two vibrating sections 33 and 34 respectively extending through two elongated cavities 35 and 36. It can be easily shown that, in this particular illustrative embodiment, the value of differential pressure is related to the natural frequencies $f_1$ and $f_2$ of the two flexible elongated members 33 and 34 by equation $$p_2 - p_1 \propto \frac{\rho}{A_L - A_S} [(f_2 L_2)^2 - (f_1 L_1)^2]. \quad (6)$$

where $A_L$ and $A_S$ respectively stand for the area of small and large discs or diaphragms 28 or 29 and 30. The data processor 37 determines the differential pressure as a function of the two natural or resonance frequencies $f_1$ and $f_2$ by using an empirically determined mathematical relationship equivalent to equation (6). The advantage provided by the embodiment shown in FIG. 4 is the placement of the two elongated members 33 and 34 respectively in the two elongated cavities 35 and 36 isolated from the pressure compartments 31 and 32, which arrangement allows the introduction of the pressure bearing fluid such as a liquid medium directly into the pressure compartments 31 and 32 or the evacuation of the elongated cavities 35 and 36 for a more accurate measurement of the differential pressure.

In FIG. 5 there is illustrated a cross section of a further embodiment of the digital pressure sensor of the present invention, that is a modified version of the embodiments shown in FIGS. 1 and 4. This embodiment includes a pair of elongated members 38 and 39 respectively extending from the two opposite sides of the deflective structural element comprising the disc or diaphragm 40 dividing the pressure chamber into the two pressure compartments, which combination is arranged in essentially the same construction as that of the embodiment shown in FIG. 1 with a few exceptions, which are, firstly, the pair of rigid reinforcing plates 41 and 42 sandwiching the disc or diaphragm 40 and respectively affixed to the two elongated members 38 and 39 in a coaxial arrangement, wherein the reinforcing plates 41 and 42 reinforce the disc or diaphragm 40 and anchor the elongated members 38 and 39 thereto while allowing a minute deflection thereof in directions parallel to the two elongated members 38 and 39, and secondly, only one elongated member 39 of the two elongated members 38 and 39 is actually vibrated by the electromagnetic vibrator 43 and the natural or resonance frequency thereof is measured by a piezo electric vibration sensor with a force detecting member 44 that also supports the extremity of the elongated member 39 in such a way that the supported section becomes a nodal section in the flexural vibration of the elongated member 39. The elongated member 38 is supported by a dummy force detecting member 45 at the extremity thereof, which becomes a nodal section in the flexural vibration. It is noticed that, as the higher of the two pressures is introduced into the pressure compartment including the elongated member 39 that is rigidly anchored at the extremity thereof, there occurs little deflective displacement of the disc or diaphragm 40 at the center section thereof affixed to the elongated members 38 and 39. As a consequence, the tension on the elongated member 38 remains a constant equal to the initial value of tension $T_0$ set by the degree of compression of the coil spring anchoring the elongated member 38, which implies that $\alpha$ appearing in equation (2) can be approximated to be equal to zero and the natural frequency $f_1$ appearing in equations (4) and (5) remains a constant value. The value of $f_1$ can be determined during the calibration of the instrument and stored in the memory bank of the processor 23 shown in FIG. 1 or the processor 37 shown in FIG. 4. Therefore, only the natural frequency $f_2$ of the elongated member 39 needs to be measured in determining the differential pressure by using a mathematical relationship equivalent to equation (4) or (5). The embodiment shown in FIG. 5 is an economic version of the embodiment shown in FIG. 1, wherein a single combination of the electromagnetic vibrator and sensor is employed in place of the pair employed in the embodiment shown in FIG. 1. It is readily recognized that the embodiment shown in FIG. 4 may operate without the electromagnetic vibrator-sensor measuring the natural frequency $f_1$ of the flexural vibration of the elongated member 33 disposed on the low pressure side and anchored by a coil spring as shown by the operating principles of the embodiment shown in FIG. 5.

Figure 6:
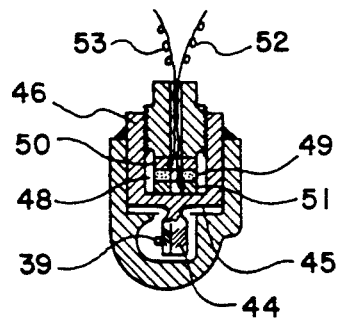
FIG. 6 illustrates another cross section of the embodiment shown in FIG. 5.

In FIG. 6 there is illustrated a cross section of an embodiment of the piezo electric vibration sensor employed i the construction of the digital pressure shown in FIG. 5, which cross section is taken along plane 6—6 as shown in FIG. 5. The force detecting member 44 extending from a thin end wall 45 of the transducer container vessel 46 supports the elongated member 39 in an arrangement wherein the section of the elongated member 39 supported by the force detecting member 44 becomes a nodal section in the flexural vibration of the elongated member 39. A transducer assembly 48 including a piezo electric disc element 49 sandwiched between a pair of electrode discs 50 and 51 is disposed within the cavity included in the transducer container vessel 46 and pressed against the thin end wall 45 of the cavity. Each of the two electrode discs 50 and 51 has two semicircular electrodes disposed on the two opposite sides of a reference plane parallel to the elongated member 40 and including the central axis of the transducer assembly 48. Two semicircular electrodes respectively included in the two electrode discs 50 and 51, and respectively disposed on the two opposite sides of the reference plane supplies two alternating electrical signals through two lead wires 52 and 53 respectively extending therefrom, which two electrical signals are combined in such a way that noise created by the structural vibration of the pressure sensor body is cancelled out therebetween and a resultant signal representing the flexural vibration of the elongated member 39 is obtained. It is readily understood that other types of piezo electric vibration sensors such as a pressure detecting type anchoring the extremity of the elongated member 39, that detects the fluctuating tension on the elongated member 39 resulting from the flexural vibration thereof, may be employed in place of the type shown in FIG. 6. It should be mentioned that the piezo electric type vibration sensor described in conjunction with FIG. 6 or described inn the above-presented paragraph may be employed in the construction of the digital pressure sensor shown in FIG. 1 or 4.

Figure 7:
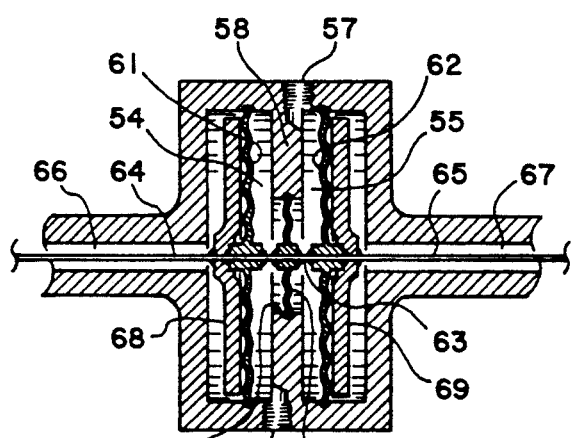
FIG. 7 illustrates a cross section of an embodiment of the differential pressure chamber usable in the construction of the digital pressure sensor of the present invention.

In FIG. 7 there is illustrated a cross section of an embodiment of the pressure chamber that may be employed in the construction of the digital pressure sensors shown in FIGS. 1, 4 and 5 in place of the pressure chambers included therein. This pressure chamber comprises a pair of pressure compartments 54 and 55 respectively including two pressure ports 56 and 57, wherein the rigid partitioning wall 58 with a central opening 59 of reduced cross sectional area sealed off by a deflective structural element such as the disc or diaphragm 60 separates the two pressure compartments 54 and 55 from one another. The two pressure compartments 54 and 55 respectively includes additional deflective structural elements such as the two discs or diaphragms of large area 61 and 62. The central portions of the discs or diaphragms 60, 61 and 62 are connected to each other by the midsection 63 of a flexible elongated member providing two vibrating sections 64 and 65 respectively extending from the two discs or diaphragms of large area 61 and 62 in two opposite directions and through two elongated cavities 66 and 67. The discs or diaphragms of large area 61 and 62 may respectively include two rigid reinforcing plates 68 and 69 having the same function as that of the elements 41 and 42 described in conjunction with FIG. 5.

Figure 8:
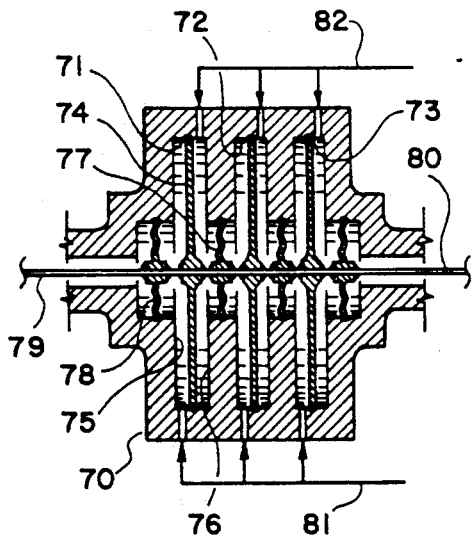
FIG. 8 illustrates a cross section of another embodiment of the differential pressure chamber employable in the construction of the digital pressure sensor.

In FIG. 8 there is illustrated a cross section of another embodiment of the pressure chamber that may be employed in place of the pressure chamber included in the embodiment shown in FIGS. 1, 4 or 5. The pressure chamber 70 comprises a plurality of stub cavities 71, 72 and 73, which combination includes a central bore extending therethrough. Each of the stub cavities 71, 72 and 73 includes a deflective structural element such as the disc or diaphragm of large area 74 that divides each stub cavity into two pressure compartments 75 and 76. The opening between each pair of adjacent stub cavities provided by the central bore is sealed off by another deflective structural element such as a disc or diaphragm of small area 77. The two extremities of the central bore are respectively extended to form a pair of elongated cavities, wherein a further deflective structural element such as the disc or diaphragm of small area 78 seals off each of the two extremities of the central bore from each of the pair of elongated cavities. The central section of a flexible elongated member providing two vibrating sections 79 and 80 connects the center portions of the discs or diaphragms 74, 77, 78, etc. to each other. A first pressure inlet line 81 introduces one of the two pressures into the first series of the pressure compartments exerting a tension on the vibrating section 79 of the elongated member, while a second pressure inlet line 82 introduces the other of the two pressures into the second series of the pressure compartments exerting a tension on the vibrating section 80 of the elongated member. This embodiment of the pressure chamber is particularly suitable for measuring differential pressure of small magnitude.

Figure 9:
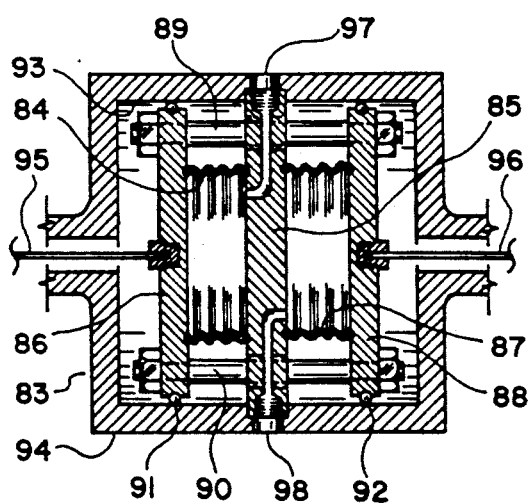
FIG. 9 illustrates a cross section of a further embodiment of the differential pressure chamber usable in the construction of the digital pressure sensor.

In FIG. 9 there is illustrated a cross section of a further embodiment of the pressure chamber that may be employed in place of the pressure chamber included in the embodiment shown in FIG. 1, 4 or 5. The pressure chamber 83 comprises a first pressure compartment provided by a first deflective structural element such as the bellows 84 disposed intermediate a stationary plate 85 and a movable plate 86, and a second pressure compartment provided by a second deflective structural element such as the bellows 87 disposed intermediate the stationary plate 85 and a movable plate 88. The two movable plates 86 and 88 are rigidly connected to one another by a plurality of tie rods 89, 90, etc. extending through the stationary plate 85 in a freely sliding relationship, wherein the plurality of ball bearings 91 and 92 disposed between the internal cylindrical surface 93 of the cylindrical cavity included in the body 94 of the pressure chamber and the cylindrical edges of the movable plates 86 and 88 facilitate free sliding movement of the combination of the two movable plates 86 and 88 in directions parallel to the central axis of the combination of the two bellows 84 and 87. A pair of flexible elongated members 95 and 96 respectively extend from the two movable plates 86 and 88 in two opposite directions. Two pressures respectively exerting tensions on the two elongated members 95 and 96 are introduced into the two pressure chambers through two pressure inlets 97 and 98, respectively.

Figure 10:
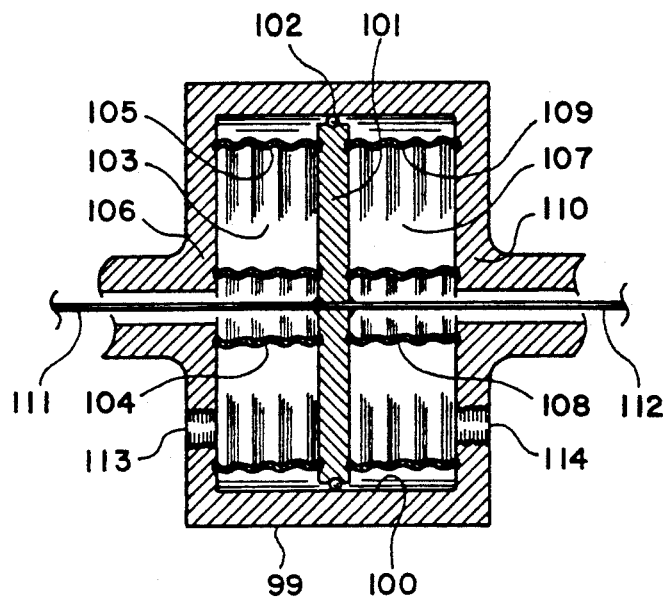
FIG. 10 illustrates a cross section of a further embodiment of the differential pressure chamber usable in the construction of the digital pressure sensor.

In FIG. 10 there is illustrated a cross section of yet another embodiment of the pressure chamber usable in the construction of a digital pressure sensor shown in FIG. 1, 4 or 5. The pressure chamber 99 comprises a cylindrical cavity 100 and a movable plate 101 disposed therein in a coaxial arrangement wherein the ball bearings 102 facilitate free sliding movement thereof in directions parallel to the central axis thereof. The first pressure compartment 103 is provided by a first deflective structural element comprising a pair of bellows 104 and 105 coaxially disposed intermediate the movable plate 101 and one end wall 106 of the cylindrical cavity 100, while the other pressure compartment 107 is provided by a second deflective structural element comprising another pair of bellows 108 and 109 coaxially disposed intermediate the movable plate 101 and the other end wall 110 of the cylindrical cavity 100. A pair of flexible elongated members 111 and 112 respectively extend from the two opposite sides of the movable plate 101 in two opposite directions through the internal spaces of the bellows 104 and 108. The two pressure ports 113 and 114 respectively introduce pressures into the two pressure compartments 103 and 107.

Figure 11:
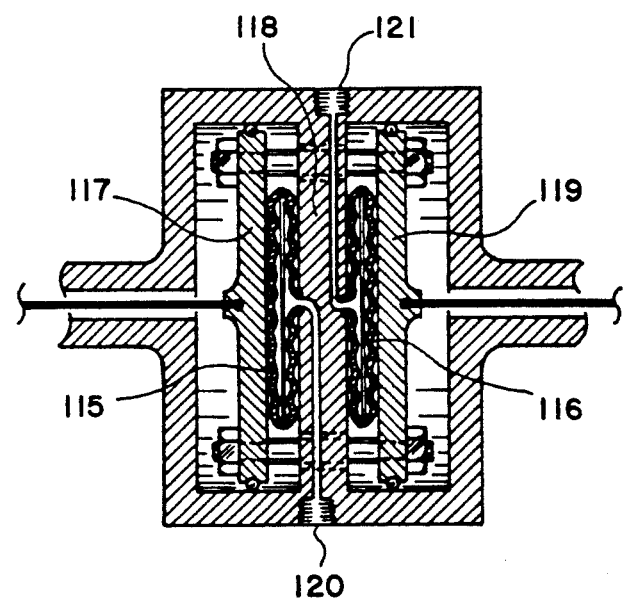
FIG. 11 illustrates a cross section of yet a further embodiment of the differential pressure chamber usable in the construction of the digital pressure sensor.

In FIG. 11 there is illustrated a cross section of yet a further embodiment of the pressure chamber usable in the construction of a digital pressure sensor. This pressure chamber has a construction similar to the embodiment shown in FIG. 9 with an exception that the pressure compartments of bellows type are now replaced with the pressure compartments of diaphragm type 115 and 116 respectively disposed intermediate the first movable plate 117 and the stationary plate 118, and intermediate the stationary plate 118 and the second movable plate 119, wherein the diaphragms constitute the deflective structural elements. The pressures are introduced into the two pancake shaped diaphragm pressure compartments 115 and 116 through the pressure inlet ports 120 and 121, respectively.

Figure 12:
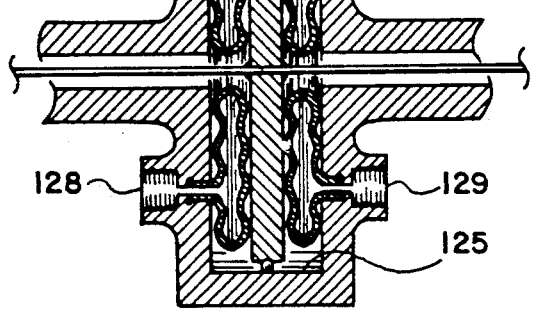
FIG. 12 illustrates a cross section of still another embodiment of the differential pressure chamber that may be employed in the construction of the digital pressure sensor.

In FIG. 12 there is illustrated a cross section of still another embodiment of the pressure chamber usable in the construction of a digital pressure sensor, that has a construction similar to the embodiment shown in FIG. 10 with one exception being that the doughnut shaped diaphragm type pressure compartments 122 and 123 now replace the bellows type pressure compartments employed in the embodiment shown in FIG. 10, wherein the diaphragms constitute the deflective structural elements. The diaphragm type pressure compartments 122 and 123 respectively including the pressure inlet ports 128 and 129 are disposed intermediate one end wall 124 of the cavity 125 housing the pressure compartments and the movable plate 126 and intermediate the movable plate 126 and the other and wall 127 of the cavity 125.

While the principles of the present invention have now been made clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or priviledge is claimed, are defined as follow:

1. An apparatus for measuring pressure comprising in combination:
   a) a body including a first pressure compartment with a first pressure port and a second pressure compartment with a second pressure port, wherein combination of the first and second pressure compartments includes at least one deflective structural element experiencing force resulting from differential pressure between the first and second pressure compartments;
   b) a first elongated member with one extremity fixedly secured to one side of said deflective structural element extending therefrom in a first direction and secured to the body in a fixed arrangement free of any tension spring at the other extremity opposite to said one extremity, wherein said first elongated member counter-acts loading on the deflective structural element exerted by pressure in the first pressure compartment and prevents deflection of the deflective structural element caused by the pressure in the first pressure compartment; and a second elongated member with one extremity fixedly secured to the other side of the deflective structural element opposite to said one side extending therefrom in a second direction and secured to the body by a tension spring at the other extremity opposite to said one extremity, wherein said second elongated member counter-acts loading on the deflective structural element exerted by pressure in the second pressure compartment and said tension spring imposes an initial tension on the first and second elongated members; wherein anchoring of said the other extremities of the first and second elongated members includes only one tension spring anchoring said the other extremity of the second elongated member to the body, and combination of a higher pressure in the first pressure compartment and a lower pressure in the second pressure compartment increases tension on the first elongated member;
   c) means for measuring value of natural frequency of flexural vibration of the first elongated member, and means for storing a value of natural frequency of flexural vibration of the second elongated member determined by calibrating the apparatus; and
   d) means for determining differential pressure between the first and second pressure compartments as a function of the measured value of natural frequency of flexural vibration of the first elongated member and the stored value of natural frequency of flexural vibration of the second elongated member.

2. An apparatus as defined in claim 1 wherein the first elongated member is disposed within a first elongated cavity extending from the first pressure compartment in said first direction and sealed off from ambient surrounding, and the second elongated member is disposed within a second elongated cavity extending from the second pressure compartment in said second direction and sealed off from ambient surrounding.

3. An apparatus as defined in claim 2 wherein the second pressure compartment and the second elongated cavity is evacuated and the second pressure port open to the second pressure compartment is sealed off.

4. An apparatus as defined in claim 1 wherein the first and second elongated members are disposed exteriorly to the first and second pressure compartments.

5. An apparatus as defined in claim 4 wherein the first elongated member is disposed within a first sealed and evacuated elongated cavity, and the second elongated member is disposed within a second sealed and evacuated elongated cavity.

6. An apparatus as defined in claim 5 wherein the second pressure compartment is evacuated and the second pressure port open to the second pressure compartment is sealed off.

7. An apparatus for measuring pressure comprising in combination:
   a) a body including a firs pressure compartment with a first pressure port and a second pressure compartment with a second pressure port, wherein combination of the first and second pressure compartments includes at least one deflective structural element experiencing force resulting from differential pressure between the first and second pressure compartments;
   b) a first elongated member with one extremity fixedly secured to one side of said deflective structural element extended therefrom in a first direction and secured to the body in a fixed arrangement free of any tension spring at the other extremity opposite to said one extremity, wherein said first elongated member counter-acts loading on the deflective structural element exerted by pressure in the first pressure compartment and prevents deflection of the deflective structural element caused by the pressure in the first pressure compartment; and a second elongated member with one extremity fixedly secured to the other side of the deflective structural element opposite to said one side extending therefrom in a second direction and secured to the body by a tension spring at the other extremity opposite to said one extremity, wherein said second elongated member counter-acts loading on the deflective structural element exerted by pressure in the second pressure compartment and said tension spring imposes an initial tension on the first and second elongated members; wherein anchoring of said the other extremities of the first and second elongated members includes only one tension spring anchoring said the other extremity of the second elongated member to the body, and combination of a higher pressure in the first pressure compartment and a lower pressure in the second pressure compartment increases tension on the first elongated member;

c) means for measuring value of natural frequency of flexural vibration of the first elongated member, and value of natural frequency of flexural vibration of the second elongated member; and d) means for determining differential pressure between the first and second pressure compartments as a function of the measured values of natural frequencies of flexural vibrations of the first and second elongated members.

8. An apparatus as defined in claim 7 wherein the first elongated member is disposed within a first elongated cavity extending from the first pressure compartment in said first direction and sealed off from ambient surrounding, and the second elongated member is disposed within a second elongated cavity extending from the second pressure compartment in said second direction and sealed off from ambient surrounding.

9. An apparatus as defined in claim 8 wherein the second pressure compartment and the second elongated cavity is evacuated and the second pressure port open to the second pressure compartment is sealed off.

10. An apparatus as defined in claim 7 wherein the first and second elongated members are disposed exteriorly to the first and second pressure compartments.

11. An apparatus as defined in claim 10 wherein the first elongated member is disposed within a first sealed and evacuated elongated cavity, and the second elongated member is disposed within a second sealed and evacuated elongated cavity.

12. An apparatus as defined in claim 11 wherein the second pressure compartment is evacuated and the second pressure port open to the second pressure compartment is sealed off.

* * * * *